(12) United States Patent
Myers et al.

(10) Patent No.: US 7,251,579 B2
(45) Date of Patent: Jul. 31, 2007

(54) METHOD, SYSTEM, AND SOFTWARE FOR CALCULATING A MULTI FACTOR TEMPERATURE INDEX

(75) Inventors: Joel N. Myers, State College, PA (US); Michael A. Steinberg, State College, PA (US); Joseph Sobel, State College, PA (US); Elliot Abrams, State College, PA (US); Evan Myers, State College, PA (US)

(73) Assignee: AccuWeather, Inc., State College, PA (US)

( * ) Notice: Subject to any disclaimer, the term of this patent is extended or adjusted under 35 U.S.C. 154(b) by 0 days.

(21) Appl. No.: 10/896,114

(22) Filed: Jul. 22, 2004

(65) Prior Publication Data
US 2004/0260473 A1 Dec. 23, 2004

Related U.S. Application Data

(63) Continuation of application No. 09/794,626, filed on Feb. 28, 2001, now Pat. No. 6,768,945.

(51) Int. Cl.
*G06F 19/00* (2006.01)
(52) U.S. Cl. .................. 702/130; 702/3; 340/601

(58) Field of Classification Search .............. 702/3, 702/130, 2; 340/601
See application file for complete search history.

(56) References Cited

U.S. PATENT DOCUMENTS 3,992,942 A 11/1976 Kuehn et al. ............... 374/109
4,261,201 A * 4/1981 Howard ..................... 374/109

(Continued)

OTHER PUBLICATIONS

Steadman, R.G., "The Assessment of Sultriness Part II; Effects of Wind, Extra Radiation and Barometric Pressure on Apparent Temperature", *Journal of Applied Meteorology*, vol. 18, Jul. 1979, American Meteorological Society, USA, pp. 874-885.

(Continued)

*Primary Examiner*—Marc S. Hoff
*Assistant Examiner*—Anthony Gutierrez
(74) *Attorney, Agent, or Firm*—Blank Rome LLP

(57) ABSTRACT

A method, system, and software for calculating a multi factor temperature index includes determining the values of at least two weather related parameters. The multi factor temperature index is calculated using the calculated values of the two weather related parameters and an actual temperature value. The two weather related parameters are selected from a group consisting of a wind speed parameter, a solar intensity parameter, a dew point parameter, an atmospheric pressure parameter and a precipitation parameter.

55 Claims, 4 Drawing Sheets

U.S. PATENT DOCUMENTS

| | | | |
|---|---|---|---|
| 4,611,113 A | 9/1986 | Halstead | 235/78 R |
| 5,924,486 A | 7/1999 | Ehlers et al. | 165/238 |
| 6,257,074 B1 | 7/2001 | Kellerman | 73/861.94 |
| 6,424,917 B1* | 7/2002 | Kalkstein et al. | 702/3 |
| 6,768,945 B2* | 7/2004 | Myers et al. | 702/3 |
| 6,820,014 B2* | 11/2004 | Ferrero et al. | 702/28 |
| 6,937,148 B2* | 8/2005 | Irwin | 340/539.1 |
| 2001/0030624 A1* | 10/2001 | Schwoegler | 342/357.13 |
| 2003/0126155 A1 | 7/2003 | Parker et al. | 707/104.1 |

OTHER PUBLICATIONS

Steadman, Robert G., "A Universal Scale of Apparent Temperature", *Journal of Climate and Applied Meteorology*, vol. 23, Dec. 1984, American Meteorological Society, USA, pp. 1674-1687.

Quayle, Robert G., et al., The Steadman Wind Chill: An Improvement Over Present Scales, *Notes and Correspondence*, Dec. 1998, American Meteorological Society, USA, pp. 1187-1193.

Steadman, Robert G., "free-convective anomaly", 3 Appl. Physiol. 87(1), Feb. 17, 1999, pp. 54-67 and 69-73.

Steadman, Robert G., "The Cold End of Apparent Temperature: Developing a Reliable Scale of Windchill", Pascoe Vale, Australia, 7 page paper from E.C. Internet Workshop, Apr. 5-7, 2000.

"How Hot is Hot?, How Safe is Safe?", The Zunis Foundation, Last Modified Mar. 21, 1999, http://www.zunis.org/how_hot_is_hot_how_safe_is_safe.htm.

* cited by examiner

FIG. 4

| Type/Intensity | Heavy | Moderate | Light |
|---|---|---|---|
| Rain | 5 | 4 | 3 |
| Rain Shower | 4 | 4 | 2 |
| Snow | 4 | 3 | 2 |
| Ice Pellets | 4 | 3 | 2 |
| Snow Shower | 4 | 3 | 1 |
| Drizzle | 3 | 2 | 1 |
| Fog (visibility less than 2 miles) | 2 | 2 | 2 | ns
METHOD, SYSTEM, AND SOFTWARE FOR CALCULATING A MULTI FACTOR TEMPERATURE INDEX

CROSS-REFERENCE TO RELATED APPLICATIONS

This application claims the benefit of priority under 35 U.S.C. § 119(e) of provisional application Ser. No. 60/186,293, entitled "Method and System For Calculating a Multi Factor Temperature Index," filed on Mar. 1, 2000, the disclosure which is incorporated herein in its entirety.

This application is a continuation of U.S. Utility application entitled, "METHOD, SYSTEM, AND SOFTWARE FOR CALCULATING A MULTI FACTOR TEMPERATURE INDEX," having U.S. Ser. No. 09/794,626, filed Feb. 28, 2001 now U.S. Pat. No. 6,768,945, which is entirely incorporated herein by reference.

BACKGROUND OF THE INVENTION

1. Field of the Invention

This invention relates generally to the field of determining a multi factor temperature index that is better indicative of the weather conditions that influence how warm or cold a person feels. More specifically, the present invention is directed to a method and system for determining a multi factor temperature index based on specified weather parameters representative of weather conditions that influence how warm or cold a person feels.

2. Description of the Related Art

The actual temperature recorded by a temperature measuring device is only one indicator of how comfortable a person feels. Other weather conditions significantly influence the comfort level felt by a person.

Although temperature is the most popular weather indicator used to communicate the weather conditions, the temperature by itself is often not a sufficiently good indicator of how comfortable a person really feels. The comfort level that a person really feels is a composite of several other weather conditions such as, for example, the wind, humidity, solar intensity, cloudiness, precipitation, atmospheric pressure and elevation.

Therefore, the actual measured temperature by itself provides only one indicia of how comfortable a person would feel under any weather conditions. Other measures such as wind chill or heat index include the temperature and one other element, such as wind speed or humidity. Furthermore, many of these existing indexes are designed to measure effects on inanimate objects rather than a clothed person. Therefore, these indexes do not provide a good indication of how the weather "really feels" to a normally clothed person.

Therefore, known temperature based indexes of weather conditions do not give an accurate feel of the weather conditions to a normally clothed person. Furthermore, none of the existing temperature based indexes include more than one other weather parameter other than the actual temperature. Therefore, current temperature based indexes do not actually represent how hot or cold a normally clothed person feels based on the totality of the weather conditions that influence the feel in addition to the measured actual temperature.

SUMMARY OF THE INVENTION

Therefore, it is a general objective of the invention to alleviate the problems and shortcomings identified above.

This and other objectives are achieved by providing a computer implemented method that calculates a multi factor temperature index by (a) determining the values of at least two weather related parameters; and (b) calculating the multi factor temperature index using the determined values of the two weather related parameters and a temperature value.

In one aspect, the present invention provides that the two weather related parameters are selected from a group consisting of a wind speed parameter, a solar intensity parameter, a dew point parameter, an atmospheric pressure parameter and a precipitation parameter.

In another aspect, the present invention provides determining three weather related parameters to calculate a multi factor temperature index based on the determined values of the three weather related parameters and a temperature value.

A further aspect of the present invention provides determining four weather related parameters and calculating the multi factor temperature index based on the four weather related parameters and a temperature value.

Another aspect of the present invention provides determining five weather related parameters and calculating the multi factor temperature index based on the five weather related parameters and a temperature value One aspect of the present invention provides that the three, four, and five weather related parameters are selected from a group consisting of a wind speed parameter, a solar intensity parameter, a dew point parameter, an atmospheric pressure parameter and a precipitation parameter.

Another aspect of the present invention provides that the weather related parameters may be derived from either measured values, observed values, or forecasted values, or from a combination of measured, observed and forecasted values.

One important aspect of the present invention provides a computer implemented method of calculating a multifactor temperature index that includes: determining the value of at least two weather related parameters; determining at least two ranges of a sunshine related parameter; and calculating a respective multifactor temperature index value for each of the two ranges of the sunshine related parameter using the at least two weather related parameters.

In another aspect the present invention provides for calculating the multifactor temperature index for one of the two ranges of the sunshine related parameter uses an UV index related parameter.

In an additional aspect, the present invention also provides for determining at least two temperature related ranges before determining the at least two ranges of a sunshine related parameter for each of the two temperature related ranges, where calculating of the multifactor temperature indexes is done differently for each of the two ranges of the two temperature related ranges.

In another important aspect, the present invention provides a computer readable data storage medium having program code recorded thereon for calculating a multi factor temperature index, the program code including: a first program code that determines values of at least two weather related parameters; and a second program code that calculates a multi factor temperature index using the determined values of the two weather related parameters and an actual temperature value.

In another important aspect, the present invention provides a computer readable data storage medium having program code recorded thereon for calculating a multifactor temperature index, the program code including: a first program code that determines values of at least two weather related parameters; a second program code that determines at least two ranges of a sunshine related parameter; and a third program code that calculates a respective multifactor temperature index value for each of the two ranges of the sunshine related parameter using the at least two weather related parameters.

In another important aspect, the present invention provides a system for calculating a multi factor temperature index, the system including: means for determining values of at least two weather related parameters; and means for calculating the multi factor temperature index using the determined values of the two weather related parameters and an actual temperature value.

In a further important aspect, the present invention provides a system for calculating a multi factor temperature index, the system including: means for determining the values of at least two weather related parameters; means for determining at least two ranges of a sunshine related parameter; and means for calculating a respective multifactor temperature index value for each of the two ranges of the sunshine related parameter using the at least two weather related parameters.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 4 shows a table used for calculating a precipitation related parameter according to the present invention.

DESCRIPTION OF THE PREFERRED
EMBODIMENT(S)

Figure 1:
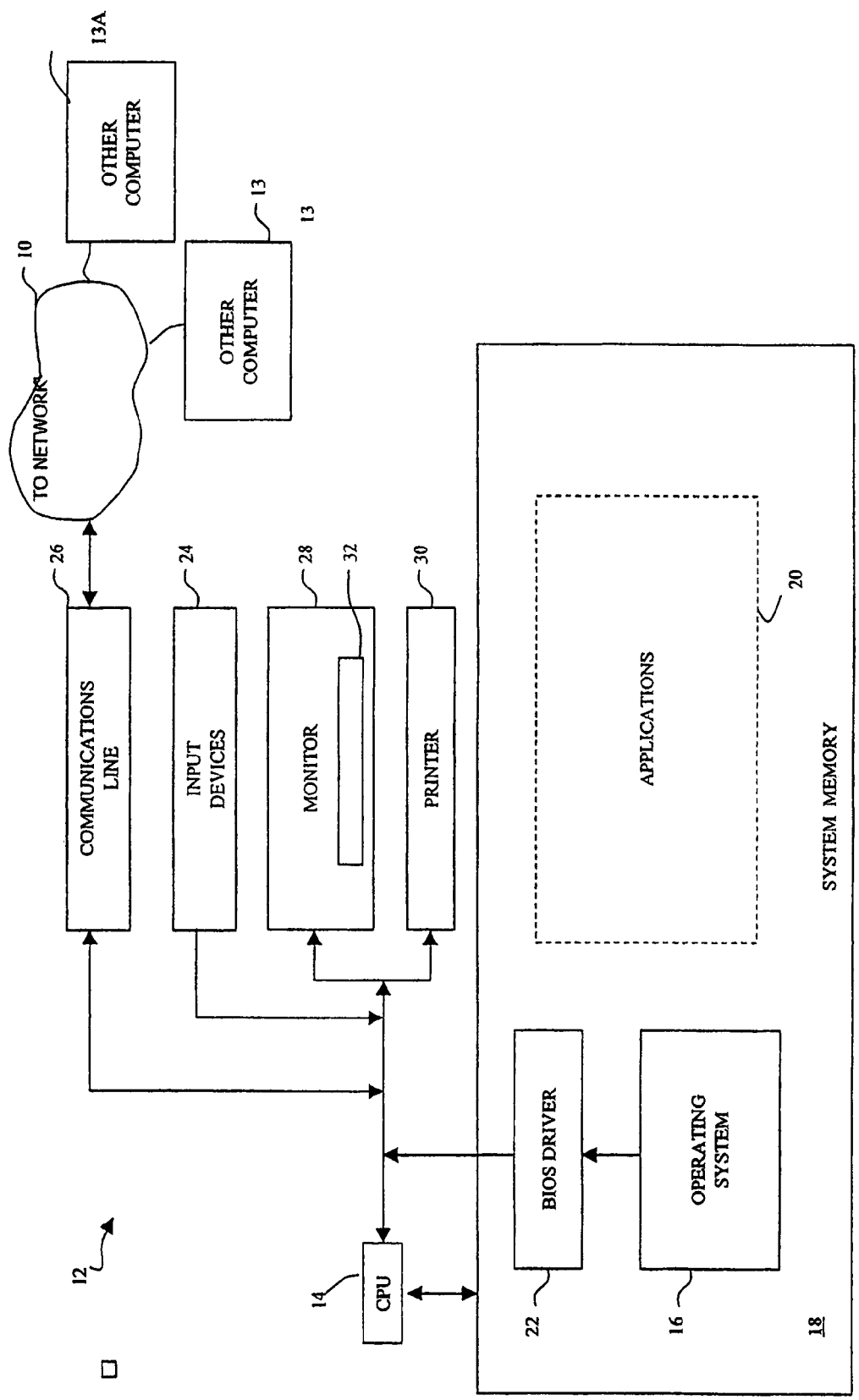
FIG. 1 is a diagram showing the components of a typical general purpose computer system connected to an electronic network that may be used to implement the present invention.

With reference to the figures, FIG. 1 is a diagram showing the components of a general purpose electronic network 10, such as a computer network. The computer network can be a public network, such as the Internet. As shown in FIG. 1, the computer system 12 including a central processing unit (CPU) 14 connected to a system memory 18. The system memory 18 typically contains an operating system 16, a BIOS driver 22, and application programs 20. In addition, the computer system 12 contains input devices 24 such as a mouse or a keyboard 32, and output devices such as a printer 30 and a display monitor 28, The computer system generally includes a communications interface 26, such as an ethernet card, to communicate to the electronic network 10. Other computer systems 13 and 13A also connect to the electronic network 10 which can be implemented as a Wide Area Network (WAN) or as an internetwork such as the Internet.

One skilled in the art would recognize that the above describes a typical computer system connected to an electronic network. It should be appreciated that many other similar configurations are within the abilities of one skilled in the art and it is contemplated that all of these configurations could be used with the method of the present invention. Furthermore, it should be appreciated that it is within the abilities of one skilled in the art to program and configure a networked computer system to implement the method steps of the present invention, discussed further herein with reference to FIG. 2 or 3.

Figure 2:
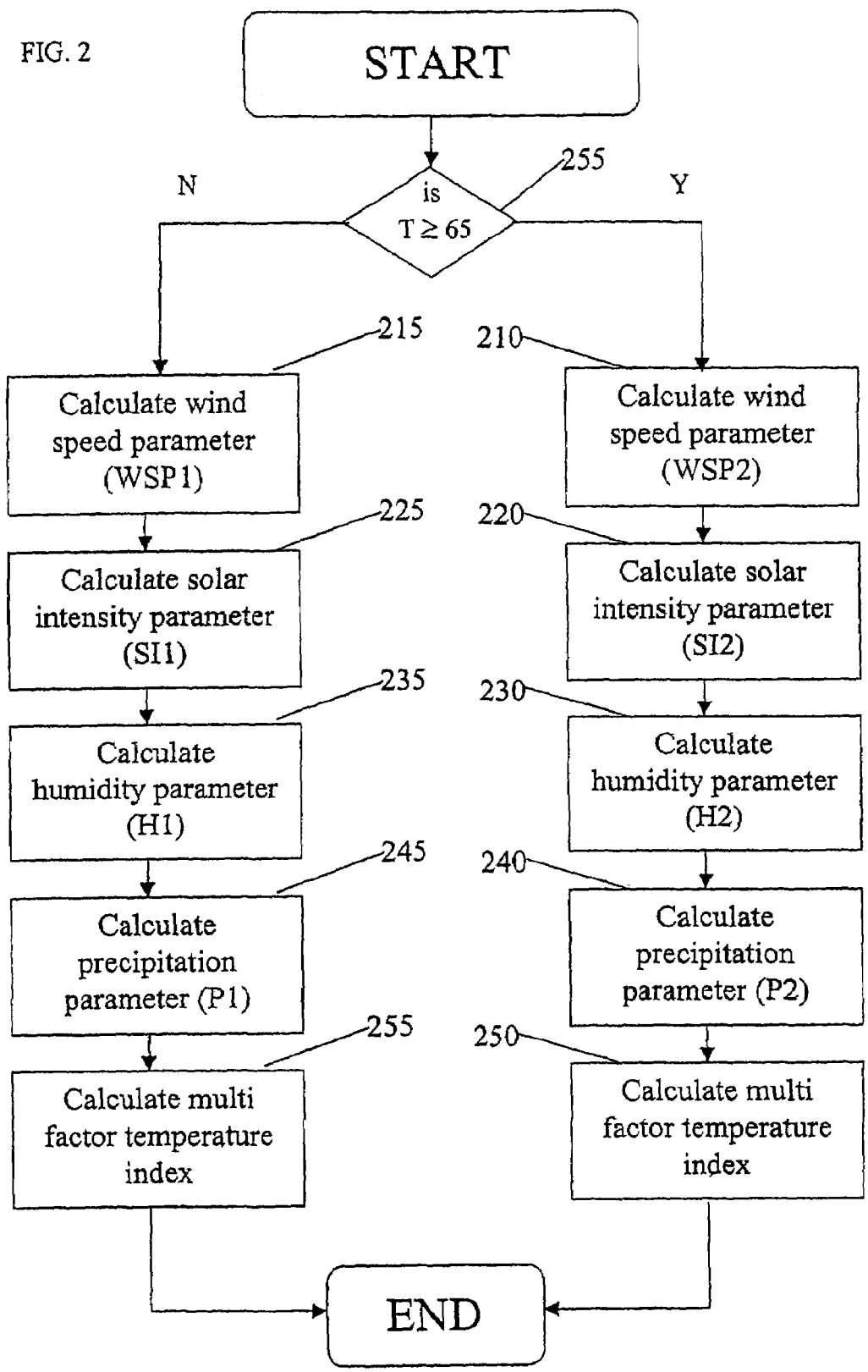
FIG. 2 is a flow diagram showing the steps of calculating a multi factor temperature index according to a preferred embodiment of the present invention.
Figure 3:
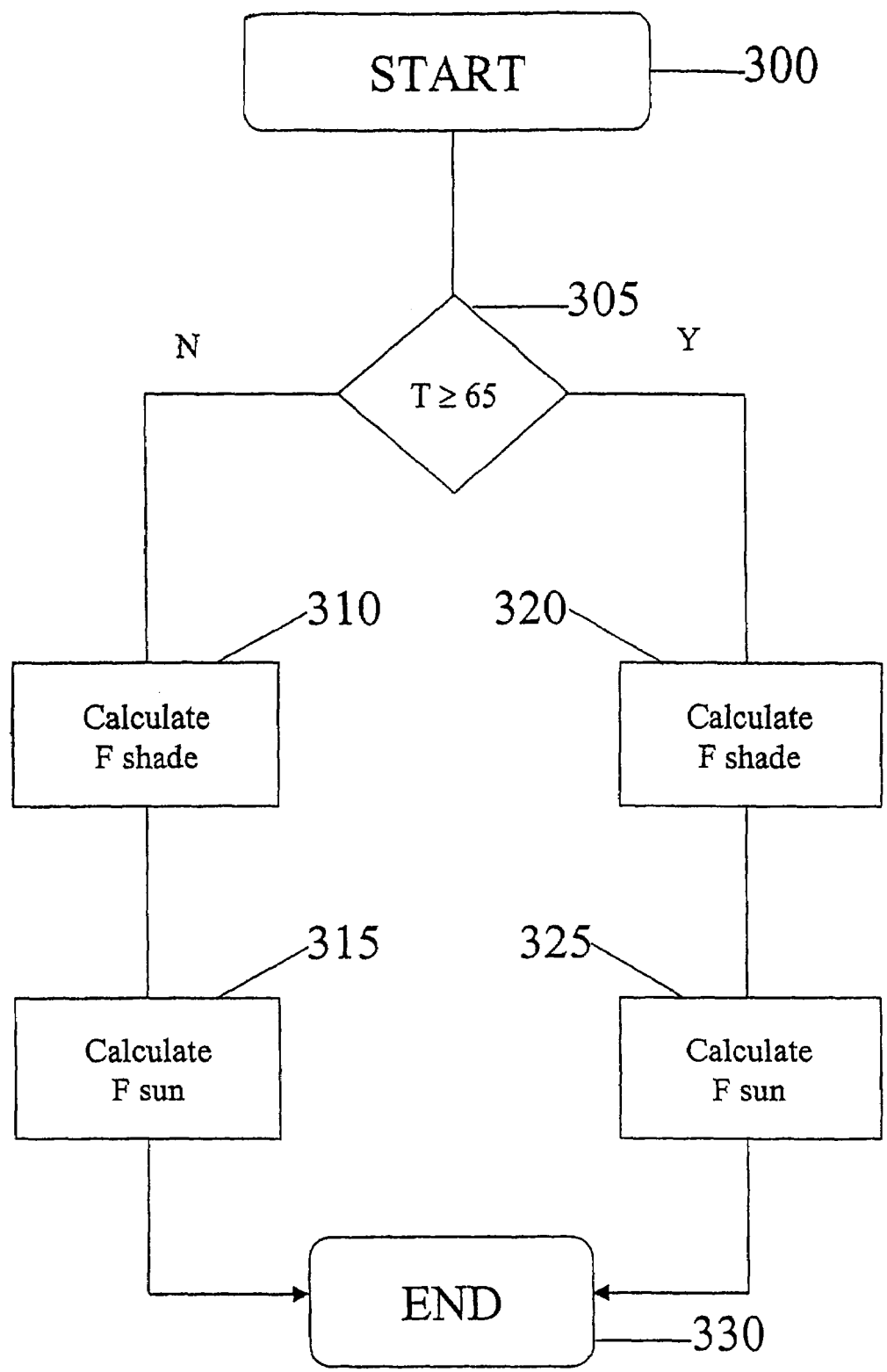
FIG. 3 is a flow diagram showing the steps of calculating a multi factor temperature index in accordance with a second preferred embodiment of the present invention.

Furthermore, the present invention contemplates providing computer readable data storage means with program code recorded thereon (i.e., software) for implementing the method steps described further herein with respect to FIG. 2 or 3 and that it is within.

FIG. 2 shows the steps of a preferred embodiment of the present invention. In step 205, a measured actual temperature (T) is compared to a comparison temperature value of 65 and if the measured actual temperature value is greater than or equal to 65, the method proceeds to step 210 determine a second wind speed parameter. However, if the measured actual temperature value (T ° F.) is less than 65, then the method proceeds to step 215 to determine a first wind speed parameter. It is to be understood, that the comparison temperature value of 65 in step 205 is a preferred comparison temperature value. That is, in step 205, a comparison temperature is used to determine calculation of at least two sets of values for weather parameters based on comparing the actual measured temperature to the comparison temperature value.

The present invention contemplates that that the comparison temperature value could also be some other value such as, for example, 60 or 70. Furthermore, the present invention also contemplates the use of more than one comparison temperature value in step 205. Therefore, two comparison temperature values can be used to determine calculating three sets of values for the weather parameters based on comparing the actual temperature to the two comparison temperature values. Likewise, the present invention also contemplates that more than two comparison temperatures may be used in step 205 to determine calculating several different sets of values for the weather parameters. Furthermore, the present invention also contemplates that instead of a comparison temperature, another weather parameter could be used as the basis to determine calculating different sets of weather parameters to be used in the determination of a multi factor temperature index corresponding to two more ranges based on the another weather parameter.

In the preferred embodiment, the comparison temperature value of 65° F. is used because the applicants' discovered that using that value yielded specific values for the multi factor temperature index that fit well with both heat balance equations and empirically induced values. Furthermore, 65° F. is also used as a pivot or base temperature for other weather related calculations, such as for calculating the heating degree days (HDD) or the cooling degree days (CDD). Each is calculated based on the departure of the average temperatures from 65° F.

Therefore, in step 210, the second wind speed parameter (WSP2) is determined by comparing the wind speed (W miles/hour) to a comparison wind speed value of 4. If the wind speed (W) is less than 4, a derived parameter ($W_A$) is calculated as (W/2+2). If the wind speed is greater than 56, the derived parameter ($W_A$) is set to 56. If the wind speed (W) is between 4 and 56, the derived parameter ($W_A$) is set equal to the wind speed (W). In the preferred embodiment, an atmospheric pressure parameter, the measured atmospheric pressure in millibars (A mb) is also used to determine the second wind speed parameter (WSP2). Therefore, in the preferred embodiment, the second wind speed parameter (WSP2) is calculated according to the following formula:

$$WSP2 = (80-T)*(0.566+0.25*\text{sqrt}(W_A)-0.0166W_A)*((\text{sqrt}(A/10))/10).$$

In step 220, a second solar intensity parameter (SI2) is determined. In the preferred embodiment, the second solar intensity parameter (SI2) is a measured value of the solar ultra violet energy in hectoJoules/meter$^2$. In alternate embodiments, the solar intensity parameter (SI2) may be determined from an ultra-violet index or even a combination of the ultra-violet index and a measured wind speed.

In step 230, a second humidity parameter (H2) is calculated. A dew point value (D ° F.) and the wind speed (W) are used to calculate a derived dew point value ($D_A$). If the dew point value (D) is greater than or equal to (55+Sqrt(W)), then $D_A$ is set to D, else $D_A$ is set to (55+sqrt(W)). Thereafter, the second humidity parameter (H2) is calculated according to the following formula:

$$H2 = (D_A - 55 - \text{sqrt}(W))^2/30.$$

In step 240, a second precipitation related parameter (P2) is calculated. In the preferred embodiment, the second precipitation related parameter (P2) is calculated based on the table shown in FIG. 4. The table discloses that, in the preferred embodiment, P2 can have a value between 1 and 5 based on the type and intensity of the precipitation as might that might measured, observed or forecasted.

One skilled in art, such as meteorologists or trained weather observers, would be able to determine the values of the precipitation related parameter by determining the type or intensity of the precipitation weather conditions described, for example, in the table shown in FIG. 4. Furthermore, most weather reports of precipitation normally include both the type and intensity of the precipitation and values derived from these reports may be used in conjunction with the exemplary table shown in FIG. 4 to determine the precipitation related parameter.

Furthermore, it is to be understood, that the precipitation related parameters, discussed above, could also be determined based on the minor modifications of the precipitation weather conditions as well as the precipitation parameter values corresponding to the various precipitation weather conditions. That is, although the preferred embodiment envisions three categories of intensity (heavy, moderate, and light) for a particular precipitation related weather condition, the present invention also contemplates that fewer or greater than three categories could also be used. With greater than three categories of intensity, it would be possible to better determine the effect of precipitation on how warm or cold the weather conditions actually feel whereas use of fewer categories may result is a less accurate representation of how warm or cold the weather conditions actually feel.

In step 250, the multi factor temperature index (MFT), according to the preferred embodiment of the present invention, is calculated according to the following formula:

$$MFT = 80 - WSP2 + SI2 + H2 - P2.$$

It should be noted that the present invention also contemplates that the multi factor temperature index (MFT) can be calculated based on the actual temperature (T) and two other weather parameters. Therefore, the MFT can also be calculated based on the temperature (T) and two other weather related parameters, such as the second wind speed parameter (WSP2) and the second solar intensity parameter (SI2). Therefore, an alternative embodiment of the present invention provides that the multi factor temperature index (MFT) can be calculated based on the following formula:

$$MFT = 80 - WSP2 + SI2.$$

It is also possible that the multi factor temperature index (MFT) is calculated as a function of the temperature, the second wind speed parameter (WSP2) and one of the second solar intensity parameter (SI2) or the second humidity parameter (H2). In this context, it should be noted that the preferred embodiment of the second wind speed parameter (WSP2) is calculated based on a measured value of both wind speed (W) and the atmospheric pressure (A). However, it is to be understood that in an alternative embodiment, the value of WSP2 can be determined based on the values of the wind speed (W) alone.

If the determination in step 205 was that the actual measured temperature was less than the comparison temperature (e.g. 65), the method proceeds to step 215. In step 215, a first wind speed parameter (WSP1) is calculated. In the preferred embodiment, the first wind speed parameter (WSP1) is calculated according to the following formula:

$$WSP1 = \text{sqrt}(W)*((\text{sqrt}(A/10))/10),$$

where W is the measured wind speed in miles per hour and A is the measured atmospheric pressure in millibars.

In step 225, the first solar intensity parameter (SI1) is calculated. In the preferred embodiment, the first solar intensity parameter (SI1) is calculated in the same manner as the second solar intensity parameter (SI2) discussed earlier herein.

In step 235, the first humidity parameter (H1) is calculated. In the preferred embodiment, the first humidity parameter is calculated in the same manner as the second humidity parameter (H2) as discussed earlier herein.

In step 245, a first precipitation related parameter (P1) is calculated. In the preferred embodiment, the first precipitation related parameter (P1) is calculated in the same manner as the second precipitation related parameter (P2) discussed earlier herein.

In step 255, the multi factor temperature index (MFT), according to a preferred embodiment of the present invention, is calculated according to the following formula:

$$MFT = T - WSP1 + SI1 + H1 - P1.$$

It should be noted that the present invention also contemplates that the multi factor temperature index (MFT) can be calculated based on the actual temperature (T) and two other weather parameters. Therefore, the MFT can also be calculated based on the temperature (T) and two other weather related parameters, such as the first wind speed parameter (WSP1) and the first solar intensity parameter (SI1). Accordingly, an alternative embodiment of the present invention provides that the multi factor temperature index (MFT) can be calculated based on the following formula:

$$MFT = T - WSP1 + H1.$$

It is also possible that the multi factor temperature index (MFT) is calculated as a function of the temperature, the first wind speed parameter (WSP1) and one of the first solar intensity parameter (SI1) or the first humidity parameter (H1).

FIG. 3 is a flowchart illustrating another preferred embodiment of the present invention that calculates an actual or forecasted multi factor temperature index that has more than one value based on a sunshine (or solar radiation) related parameter. For example, this embodiment provides that one MFT index value is calculated that approximates a real feel of a person in a shaded environment while another MFT index value approximates a real feel of a person in a sunny environment (that is, an environment in which a person is exposed to solar radiation). Therefore, a pair of such values are even more effective in estimating how a person feels rather than a single value since each value of the pair may be more appropriate for a particular circumstance (for example, being in the shade versus being under the sun).

It should also be understood that while the preferred embodiment discussed further herein contemplates two multi factor index values based on a sunshine related parameter, the present invention also contemplates calculating different multi factor index values for different ranges of other weather related parameters and that more than two ranges can be used for any of the weather related parameters. Specifically, while the preferred embodiment contemplates calculating one value of the MFT index for shade and one value for sun, other preferred embodiments may calculate three or more values corresponding, for example, to shade, diffuse sunlight, and bright sunlight to better approximate the feel of the temperature to a person based on the environment of the person.

In the preferred embodiment, in step 305, if the temperature is greater than or equal to a predetermined value such as 65° F., the process proceeds to steps 320 to determine a multi factor temperature index appropriate for a person for whom the direct reception of any incoming solar radiation is blocked by non-meteorological objects, such as buildings or trees. Thereafter, in step 325, a multi factor temperature index is calculated that is appropriate for a person who is not blocked from direct reception of any incoming solar radiation. A preferred embodiment of the determination of the multi factor temperature indexes in steps 320 and 325 are discussed next.

In step 320, the multifactor temperature index is determined in the preferred embodiment based on the following formula:

$$F_{SHADE} = T - \text{sqrt}(W) * A1 + D1 + P1,$$

where T is the actual or forecasted ambient temperature, W is the wind speed in miles/hour, and $A1 = \text{sqrt}(A/10)/10$ with A being the atmospheric pressure (mb) not reduced to sea level.

D1 is calculated by using the following formulas:

$$D1 = (DA - 55 - \text{sqrt}(W))^2/30;$$

$$DA = D \text{ if } D >= (55 + \text{sqrt}(W)) \text{ otherwise } DA = (55 + \text{sqrt}(W));$$

where D is the dew point in ° F. P1 is calculated as a value from 1 to 5 using a table as discussed earlier herein with respect to step 240 and the table shown in FIG. 4.

In step 325, the multifactor temperature index is determined based on the following formula:

$$F_{SUN} = T - \text{sqrt}(W) * A1 + S2 + D1 - P1.$$

S2 is calculated according to following formulas:

$$S2 = ((26 * \sin(7.5U))/(\text{sqrt}(WB) * A1)) * (2 - T/90);$$

U is the UV Index; WB is the wind speed in miles/hour if W>=4 or 4 otherwise. Therefore, the present invention provides a pair of values for the multi factor temperature index, determined in steps 320 and 325, that provide a better feel for a person depending on whether the person is the shade versus being directly exposed to the sunlight.

In step 305, if the determination is made that the actual or forecasted temperature is less than 65° F., the process according to the present invention proceeds to step 310 to determine a multi factor temperature index that is appropriate for a person that is blocked from direct solar radiation (for example, in a shaded area). Thereafter, the present invention proceeds to step 315 to determine a multifactor temperature index in step 315 that more appropriately represents the feel of a person that is exposed to solar radiation (for example, is outdoors under the sun). A preferred embodiment of these multifactor temperature index determinations are discussed in the following paragraphs.

In step 310, the multifactor temperature index is calculated using the following formula:

$$F_{SHADE} = 80 - (80 - T) * W1 * A1 + D1 - P1$$

where $W1 = 0.566 + 0.25 * \text{sqrt}(WA) - 0.0166 * WA$; where WA=W (Wind Speed in Miles/hour) if W>=4, otherwise WA=(W/2)+2 with a maximum value of 56. The other parameters are calculated in the same manner as discussed earlier with respect to like parameters in steps 320 and 325.

In step 325, the multifactor temperature index is calculated using the following formula:

$$F_{SUN} = 80 - (80 - T) * W1 * A1 - S2 + D1 - P1$$

where the parameters are calculated in the same manner as discussed earlier with respect to like parameters in steps 310, 320 and 325.

It is to be understood that the multi factor temperature index, according to the present invention, can also be calculated based on forecasted or observed values of the weather related parameters rather than values derived from measured values of the weather related parameters. Furthermore, the present invention also contemplates that the multi factor weather index can be calculated based on weather related parameters derived from a combination of actually measured, observed or forecasted weather related parameter values.

Therefore, some of the advantages of the multi factor temperature index calculated according to the present invention is that it provides a better indication of how a normally clothed person feels based on weather conditions in addition to the feel based only on the actual temperature. Therefore, the wind speed, sunshine or cloudiness, the humidity, the precipitation, and the atmospheric pressure are all weather related factors which affect how warm or cold a normally clothed person feels. The multi factor temperature index takes into account these additional weather related factors and, therefore, provides a better indication to a person of how warm or cold the weather actually feels. The second embodiment, discussed with reference to FIG. 3, provides more than one value of the multi factor temperature index to better reflect the feel under different conditions. Therefore, for example, one value of the multi factor temperature index estimates the feel of the weather to a person who is in a shaded area versus a person that is exposed to sunlight.

Other embodiments of the invention will be apparent to those skilled in the art from a consideration of the specification and the practice of the invention disclosed herein. It is intended that the specification be considered as exemplary only, with the true scope and spirit of the invention also being indicated by the following claims.

What is claimed is:

1. A computer implemented method of calculating a multifactor temperature index comprising:
   establishing a comparison temperature value;
   providing a value for T;
   comparing the value for T to the comparison temperature value;

determining at least one of a first and second set of values for at least two weather related parameters depending on the comparison of the value for T and the comparison temperature value;

determining at least two ranges of a sunshine related parameter;

calculating a respective multifactor temperature index value for each of the ranges of the sunshine related parameter using the weather related parameters; and outputting at least one of the calculated multifactor temperature indices.

2. The computer implemented method of calculating a multifactor temperature index according to claim 1, wherein calculating the multifactor temperature index for one of the ranges of the sunshine related parameter is done using a UV index related parameter.

3. The computer implemented method according to claim 1, further comprising:

determining at least two temperature related ranges before determining the ranges of the sunshine related parameter for each of the temperature related ranges, wherein calculation of the multifactor temperature indexes is done differently for each of the ranges of the sunshine related parameter of the two temperature related ranges.

4. A computer readable data storage medium having program code recorded thereon for calculating a multifactor temperature index, the program code comprising:

a first program code that receives a comparison temperature value and a value for T and compares the value for T to the comparison temperature value;

a second program code that determines at least one of a first and second set of values for at least two weather related parameters depending on the comparison of the value for T and the comparison temperature value;

a third program code that calculates a multifactor temperature index using one of the determined first and second set of values of the weather related parameters and the value for T; and a fourth program code that outputs the multifactor temperature index.

5. The computer readable data storage medium according to claim 4, wherein the weather related parameters are selected from a group consisting of a wind speed parameter, a solar intensity parameter, a dew point parameter, an atmospheric pressure parameter and a precipitation parameter.

6. The computer readable data storage medium according to claim 4, wherein the first program code calculates three weather related parameters.

7. The computer readable data storage medium according to claim 6, wherein the three weather related parameters are selected from a group consisting of a wind speed parameter, a solar intensity parameter, a dew point parameter, an atmospheric pressure parameter and a precipitation parameter.

8. The computer readable data storage medium according to claim 4, wherein the first program code calculates four weather related parameters.

9. The computer readable data storage medium according to claim 8, wherein the four weather related parameters are selected from a group consisting of a wind speed parameter, a solar intensity parameter, a dew point parameter, an atmospheric pressure parameter and a precipitation parameter.

10. The computer readable data storage medium according to claim 4, wherein the first program code calculates five weather related parameters.

11. The computer readable data storage medium according to claim 10, wherein the five weather related parameters include a wind speed parameter, a solar intensity parameter, a dew point parameter, an atmospheric pressure parameter and a precipitation parameter.

12. The computer readable data storage medium according to claim 4, wherein the first program code receives measured values of the weather related parameters.

13. The computer readable data storage medium according to claim 12, wherein the first program code includes program code that derives the values of the weather related parameters from the measured weather related parameters.

14. The computer readable data storage medium according to claim 4, wherein the first program code includes program code for forecasting the weather related parameters.

15. The computer readable data storage medium according to claim 14, wherein the first program code includes program code that derives the values of the weather related parameters from the forecasted weather related parameters.

16. The computer readable data storage medium according to claim 4, wherein the first program code includes program code for receiving observed weather related parameters.

17. The computer readable data storage medium according to claim 16, wherein the first program code further includes program code that derives the values of the weather related parameters from the observed weather related parameters.

18. A computer readable data storage medium having program code recorded thereon for calculating a multifactor temperature index, the program code comprising:

a first program code that receives a comparison temperature value and a value for T and compares the value for T to the comparison temperature value;

a second program code that determines at least one of a first and second set of values for at least two weather related parameters depending on whether the value for T is greater than or equal to or less than the comparison temperature value;

a third program code that determines at least two ranges of a sunshine related parameter depending on whether the value for T is greater than or equal to or less than the comparison temperature value;

a fourth program code that calculates a respective multifactor temperature index value for each of the ranges of the sunshine related parameter using the weather related parameters; and a fifth program code that outputs at least one of the calculated multifactor temperature indices.

19. A system for calculating a multifactor temperature index, comprising:

means for determining if a value for T is greater than or equal to or less than a comparison temperature value;

means for determining one of a first and second set of values for at least two weather related parameters, wherein the first set of values is used if the value for T is greater than or equal to the comparison temperature value and wherein the second set of values is used if the value for T is less than the comparison temperature value;

means for calculating the multifactor temperature index using the determined values of the weather related parameters and the value for T; and means for outputting the multifactor temperature index.

20. A system for calculating a multifactor temperature index, comprising:
- means for determining if a value for T is greater than or equal to or less than a comparison temperature value;
- means for determining one of a first and second set of values for at least two weather related parameters, wherein the first set of values is used if the value for T is greater than or equal to the comparison temperature value and wherein the second set of values is used if the value for T is less than the comparison temperature value;
- means for determining at least two ranges of a sunshine related parameter;
- means for calculating a respective multifactor temperature index value for each of the ranges of the sunshine related parameter using the weather related parameters; and
- means for outputting at least one of the calculated multifactor temperature indices.

21. A processor readable memory in a system for displaying a multifactor temperature index, which receives and outputs data embodied in data signal, wherein the data signal comprises:
- a value representative of the multifactor temperature index wherein the multifactor temperature index is calculated by establishing a comparison temperature value, providing a value for T, comparing the value of T to the comparison temperature value, determining at least one of a first and second set of values for at least two weather related parameters depending on whether the value for T is greater than or equal to or less than the comparison temperature value, and calculating the multifactor temperature index by using the weather related parameters and the value for T.

22. The processor readable memory according to claim 21, wherein the weather related parameters are selected from a group consisting of a wind speed parameter, a solar intensity parameter, a dew point parameter, an atmospheric pressure parameter and a precipitation parameter.

23. The processor readable memory according to claim 21, wherein determining the values for the weather related parameters comprises calculating three weather related parameters.

24. The processor readable memory according to claim 23, wherein the three weather related parameters are selected from a group consisting of a wind speed parameter, a solar intensity parameter, a dew point parameter, an atmospheric pressure parameter, and a precipitation parameter.

25. The processor readable memory according to claim 21, wherein determining the values for the weather related parameters comprises calculating four weather related parameters.

26. The processor readable memory according to claim 25, wherein the four weather related parameters are selected from a group consisting of a wind speed parameter, a solar intensity parameter, a dew point parameter, an atmospheric pressure parameter, and a precipitation parameter.

27. The processor readable memory according to claim 21, wherein determining the values for the weather related parameters comprises calculating five weather related parameters.

28. The processor readable memory according to claim 27, wherein the five weather related parameters include a wind speed parameter, a solar intensity parameter, a dew point parameter, an atmospheric pressure parameter, and a precipitation parameter.

29. The processor readable memory according to claim 27, wherein determining the values for the weather related parameters comprises measuring the weather related parameters.

30. The processor readable memory according to claim 21, wherein determining the values for the weather related parameters comprises forecasting the weather related parameters.

31. A method of outputting a multifactor temperature index comprising the steps of:
- receiving a multifactor temperature index, wherein the multifactor temperature index is calculated by:
  - (a) establishing a comparison temperature value;
  - (b) providing a value for T;
  - (c) comparing the value for T to the comparison temperature value;
  - (d) providing at least one of a first and second set of values for at least two weather related parameters depending on whether the value for T is greater than or equal to or less than the comparison temperature value; and
  - (e) calculating the multifactor temperature index using the values for the at least two weather related parameters and T, and
- outputting the received multifactor temperature index.

32. The method according to claim 31, wherein the step of receiving the multifactor temperature index comprises receiving a computer data signal embodied on a carrier wave wherein the computer data signal comprises a value representative of the multifactor temperature index.

33. The method according to claim 32, wherein the step of outputting the multifactor temperature index comprises at least one of displaying, storing, and transmitting the computer data signal.

34. The method according to claim 31, wherein the step of outputting the multifactor temperature index comprises at least one of displaying, storing, and transmitting the multifactor temperature index.

35. A computer implemented method of calculating a multifactor temperature index (MFT) comprising the steps of:
- (a) establishing a comparison temperature value;
- (b) providing a value for T;
- (c) comparing the value for T to the comparison temperature value;
- (d) providing at least one of a first and second set of values for at least two weather related parameters depending on whether the value for T is greater than or equal to or less than the comparison temperature value;
- (e) calculating the MFT using the at least one of a first and second set of values for the at least two weather related parameters and the value for T; and
- (f) outputting the MFT.

36. The method according to claim 35, wherein the weather related parameters are any two parameters selected from a group consisting of a wind speed parameter, a solar intensity parameter, a dew point parameter, an atmospheric pressure parameter and a precipitation parameter.

37. The method according to claim 36, wherein step (e) comprises calculating the MFT according to MFT=T−WSP1+SI1+H1−P1 when T is less than the comparison temperature value or according to MFT=80−WSP2+SI2+H2−P2 when T is greater than or equal to the comparison temperature value, where WSP1 and WSP2 are the wind speed parameters, SI1 and SI2 are the solar intensity parameters, H1 and H2 are the dew point parameters, and P1 and P2 are the precipitation parameters.

38. The method according to claim 36, wherein step (e) comprises calculating the MFT according to MFT=80−(80−T)*W1*A1+D1−P1 or MFT=80−(80−T)*W1*A1−S2+D1−P1 when T is less than the comparison temperature value or according to MFT=T−sqrt(W)*A1+D1+P1 or MFT=T−sqrt(W)*A1+S2+D1+P1 when T is greater than or equal to the comparison temperature value, where A1 is the pressure parameter, S2 is the solar intensity parameter, D1 is the dew point parameter, and P1 is the precipitation parameter.

39. The method according to claim 35, wherein the values for the weather related parameters are based on measurements.

40. The method according to claim 35, wherein the values for the weather related parameters are based on forecasts.

41. The method according to claim 35, wherein the values for the weather related parameters are based on observations.

42. The method according to claim 35 wherein the step of outputting the MFT comprises transmitting the MFT.

43. The method according to claim 42, wherein the step of transmitting the MFT comprises transmitting a computer data signal embodied on a carrier wave wherein the computer data signal comprises a value representative of the MFT.

44. A computer-implemented method of calculating a multifactor temperature index (MFT) comprising the steps of:
   (a) establishing a comparison temperature value;
   (b) providing a value for T;
   (c) when T is less than the comparison temperature value, providing a value for a first weather related parameter;
   (d) when T is greater than or equal to the comparison temperature value, providing a value for a second weather related parameter;
   (e) calculating the MFT using the provided values for the first weather related parameter and the value for T when the value for T is less than the comparison temperature value or using the provided values for the second weather related parameter and the value for T when the value for T is greater than or equal to the comparison temperature value; and
   (f) outputting the MFT.

45. A computer-implemented method of calculating a multifactor temperature index (MFT) comprising the steps of:
   (a) establishing a comparison temperature value;
   (b) providing a value for T;
   (c) when the value for T is less than the comparison temperature value, providing a value for a weather related parameter;
   (d) when the value for T is greater than or equal to the comparison temperature value, providing a value for a second weather related parameter;
   (e) when the value for T is less than the comparison temperature value, providing a value for a third weather related parameter;
   (f) when the value for T is greater than or equal to the comparison temperature value, providing a value for a fourth weather related parameter;
   (g) calculating the MFT using the provided values for the first and third weather related parameters and the value for T when the value for T is less than the comparison temperature value or using the provided values for the second and fourth weather related parameters and the value for T when the value for T is greater than or equal to the comparison temperature value; and
   (h) outputting the MFT.

46. The method according to claim 45, wherein each of the weather related parameters are selected from a group consisting of a wind speed parameter, a solar intensity parameter, a dew point parameter, an atmospheric pressure parameter and a precipitation parameter.

47. A method of calculating a multifactor temperature index comprising:
   (a) establishing a plurality of comparison temperature values from a set of temperature values;
   (b) establishing at least one comparison condition for each of the plurality of comparison temperature values;
   (c) providing a value for T from the set of temperature values;
   (d) comparing the value for T to the plurality of comparison temperature values until one of the at least one comparison conditions is satisfied;
   (e) determining values for at least two weather related parameters depending on the value for T and the satisfied comparison condition;
   (f) calculating the multifactor temperature index using the values of the at least two weather related parameters and the value for T; and
   (g) outputting the multifactor temperature index.

48. The method of calculating a multifactor temperature index according to claim 47, wherein the plurality of comparison temperature values includes 65 degrees Fahrenheit.

49. The method of calculating a multifactor temperature index according to claim 48, wherein the at least one comparison conditions checks for whether the value for T is greater than or equal to one of the plurality of comparison temperature values.

50. A method of calculating a multifactor temperature index comprising:
   (a) establishing a multifactor temperature index comprising a constant parameter and a plurality of weather related parameters;
   (b) comparing a value for a first weather related parameter to a value for a comparison weather related parameter;
   (c) based on the comparison, assigning a value to each of the plurality of weather related parameters and the constant parameter;
   (d) calculating the multifactor temperature index using the values for the plurality of weather related parameters and the constant parameter; and
   (e) outputting the multifactor temperature index,
   wherein each of the plurality of weather related parameters, the first weather related parameter, and the comparison weather related parameter is selected from the group consisting of temperature, wind speed, solar intensity, dew point, atmospheric pressure, and precipitation, and wherein the first weather related parameter and the comparison weather related parameter are the same parameter.

51. The method according to claim 50, wherein the values for the weather related parameters are based on one of measurements, forecasts, and observations.

52. The method according to claim 50, wherein the step of calculating the multifactor temperature index includes using the constant parameter and either two, three, four, five, or six weather related parameters.

53. A computer implemented method of calculating a multifactor temperature index (MFT) comprising the steps of:
   (a) establishing a comparison temperature value;
   (b) providing a value for T;
   (c) comparing the value for T to the comparison temperature value;
   (d) providing at least one of a first and second set of values for at least two weather related parameters depending on the comparison of the value for T to the comparison temperature value;

(e) calculating the MFT using the at least one of a first and second set of values for the at least two weather related parameters and the value for T; and (f) outputting the MFT.

54. The method according to claim 53, wherein the weather related parameters are any two parameters selected from a group consisting of a wind speed parameter, a solar intensity parameter, a dew point parameter, an atmospheric pressure parameter and a precipitation parameter.

55. The method according to claim 53, wherein the values for the weather related parameters are based on one of measurements, forecasts, and observations.

* * * * *